(12) United States Patent
Chervu

(10) Patent No.: US 11,351,926 B2
(45) Date of Patent: Jun. 7, 2022

(54) VEHICLE CROSSBAR ASSEMBLY

(71) Applicant: NISSAN NORTH AMERICA, INC., Franklin, TN (US)

(72) Inventor: Raghu Chervu, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 16/945,401

(22) Filed: Jul. 31, 2020

(65) Prior Publication Data
US 2022/0032852 A1    Feb. 3, 2022

(51) Int. Cl.
*B60R 9/045* (2006.01)

(52) U.S. Cl.
CPC ................. *B60R 9/045* (2013.01)

(58) Field of Classification Search
CPC .................................................. B60R 9/045
USPC ............................................................ 224/314
See application file for complete search history.

(56) References Cited

U.S. PATENT DOCUMENTS

| | | | | |
|---|---|---|---|---|
| 2,436,228 A * | 2/1948 | Purchase | ................. | B60R 9/058 224/314 |
| 2,528,794 A * | 11/1950 | Seidler | ..................... | B60R 7/10 224/313 |
| 2,630,257 A * | 3/1953 | Nielsen | ..................... | B60R 9/12 224/314 |
| 3,165,353 A * | 1/1965 | Weise | ..................... | B60R 9/04 296/210 |
| 3,561,653 A * | 2/1971 | Eriksson | ................. | B60R 9/045 224/314 |
| 3,899,110 A * | 8/1975 | Binding | ................. | B60R 9/045 224/314 |
| 4,294,388 A * | 10/1981 | Wunstel | ................. | B60R 9/058 224/315 |
| 4,752,022 A * | 6/1988 | Thulin | ................. | B60R 9/045 224/314 |
| 5,020,172 A * | 6/1991 | Timm | ................. | A47C 17/32 403/102 |
| 5,511,709 A * | 4/1996 | Fisch | ................. | B60R 9/045 224/316 |
| 6,260,751 B1 * | 7/2001 | Heiler | ................. | B60R 9/045 224/314 |
| 8,100,306 B2 * | 1/2012 | Gerhardt | ................. | B60R 9/045 224/320 |
| 8,235,264 B2 * | 8/2012 | Aftanas | ................. | B60R 9/045 224/321 |
| 8,348,111 B2 * | 1/2013 | Heuchert | ................. | B60R 9/048 224/321 |
| 8,978,946 B2 * | 3/2015 | Gerhardt | ................. | B60R 9/052 224/321 |

(Continued)

*Primary Examiner* — Peter N Helvey
(74) *Attorney, Agent, or Firm* — Global IP Counselors, LLP

(57) ABSTRACT

A vehicle crossbar assembly includes a crossbar. The crossbar has a first part and a second part that are movably attached to each other. The first part is configured to be supported to a first roof rack component of a vehicle. The second part is configured to be supported to a second roof rack component of the vehicle. The first and second parts are movable with respect to each other between an installable state and a storage state. The first and second parts extend from one another when in the installable state. The first and second parts are folded with respect to each other in the storage state.

14 Claims, 8 Drawing Sheets

(56) References Cited

U.S. PATENT DOCUMENTS

| | | | |
|---|---|---|---|
| 10,059,274 B2 * | 8/2018 | Kmita | B60R 9/058 |
| 10,814,792 B2 * | 10/2020 | Betzalel | B60R 9/04 |
| 2007/0039985 A1 * | 2/2007 | Warren | B60R 9/04 |
| | | | 224/321 |

* cited by examiner

VEHICLE CROSSBAR ASSEMBLY

BACKGROUND

Field of the Invention

The present invention generally relates to vehicle crossbar assembly. More specifically, the present invention relates to vehicle crossbar assembly that can be modified for storage.

Background Information

Vehicle roof racks are generally secured to the roof of a vehicle and are effective to store and transport objects on the roof of the vehicle without interfering with passenger occupancy and without the limitations of common trunk designs. Vehicle roof racks typically include several elongated members, such as siderails and crossbars, which may be selectively and removably connected to the vehicle to form a frame or support structure. Items such as skis, bikes, luggage, and other large (and small) items can secured to the roof rack by conventional fastening means, such as using bungee cords.

SUMMARY

In view of the state of the known technology, one aspect of the present disclosure is to provide a vehicle crossbar assembly comprising a crossbar. The crossbar has a first part and a second part that are movably attached to each other. The first part is configured to be supported to a first roof rack component of a vehicle. The second part is configured to be supported to a second roof rack component of the vehicle. The first and second parts are movable with respect to each other between an installable state and a storage state. The first and second parts extend from one another when in the installable state. The first and second parts are folded with respect to each other in the storage state.

In view of the state of the known technology, another aspect of the present disclosure is to provide a vehicle crossbar assembly comprising a crossbar and a first retention structure. The crossbar has a first part and a second part that are movable with respect to each other between an installable state and a storage state. The first and second parts extend from one another in the installable state. The first and second parts are folded with respect to each other in the a storage state. The first retention structure is hingedly connecting the first and second parts when the crossbar is in the storage state.

In view of the state of the known technology, another aspect of the present disclosure is to provide a vehicle roof rack assembly comprising a first siderail, second siderail and a crossbar. The first siderail and the second siderail are installed to a vehicle roof. The crossbar has a first part supported to the first siderail and a second part supported to the second siderail. The crossbar is movable between an installable state and a storage state. The crossbar is installed to the first and second siderails in the installable state. The first and second parts are folded with respect to each other in the storage state.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
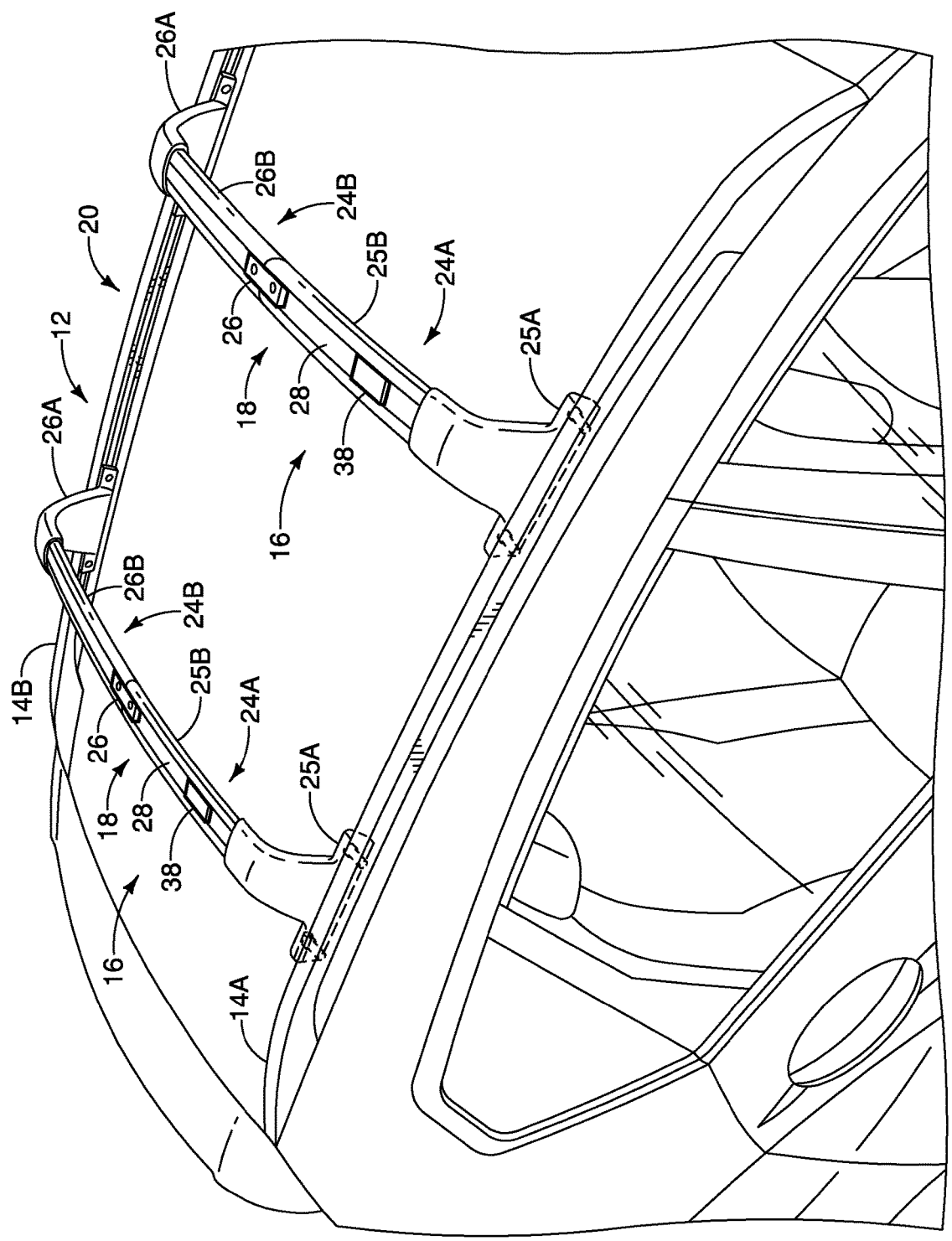
FIG. 1 is a top perspective view of a vehicle roof that is equipped with a vehicle roof rack assembly having a crossbar assembly in accordance with a first illustrated embodiment.

Referring initially to FIG. 1, a vehicle roof 10 of a vehicle having a vehicle roof rack assembly 12 is illustrated. The vehicle roof rack assembly 12 comprises a first siderail 14A and a second siderail 14B that are installed to opposite lateral sides of the vehicle roof 10 or vehicle roof panel. The pair of siderails 14A and 14B extend longitudinally along a lengthwise direction of the vehicle roof 10. In the illustrated embodiment, the vehicle roof rack assembly 12 further includes a crossbar assembly 16.

The crossbar assembly 16 is fixed to the siderails 14A and 14B. As shown, the crossbar assembly 16 include a pair of crossbars 18 extending laterally between the siderails 14A and 14B. When the vehicle roof rack assembly 12 is installed onto the vehicle roof 10, the crossbars 18 extend between the siderails 14A and 14B. As the crossbars 18 are basically identical, only one crossbar 18 will be discussed for brevity. Thus, while the crossbar assembly 16 is illustrated as including a pair of crossbars 18, it will be apparent to those skilled in the vehicle field from this disclosure that the crossbar assembly 16 can include a single crossbar 18 or additional crossbars 18, as needed and/or desired.

Figure 3:
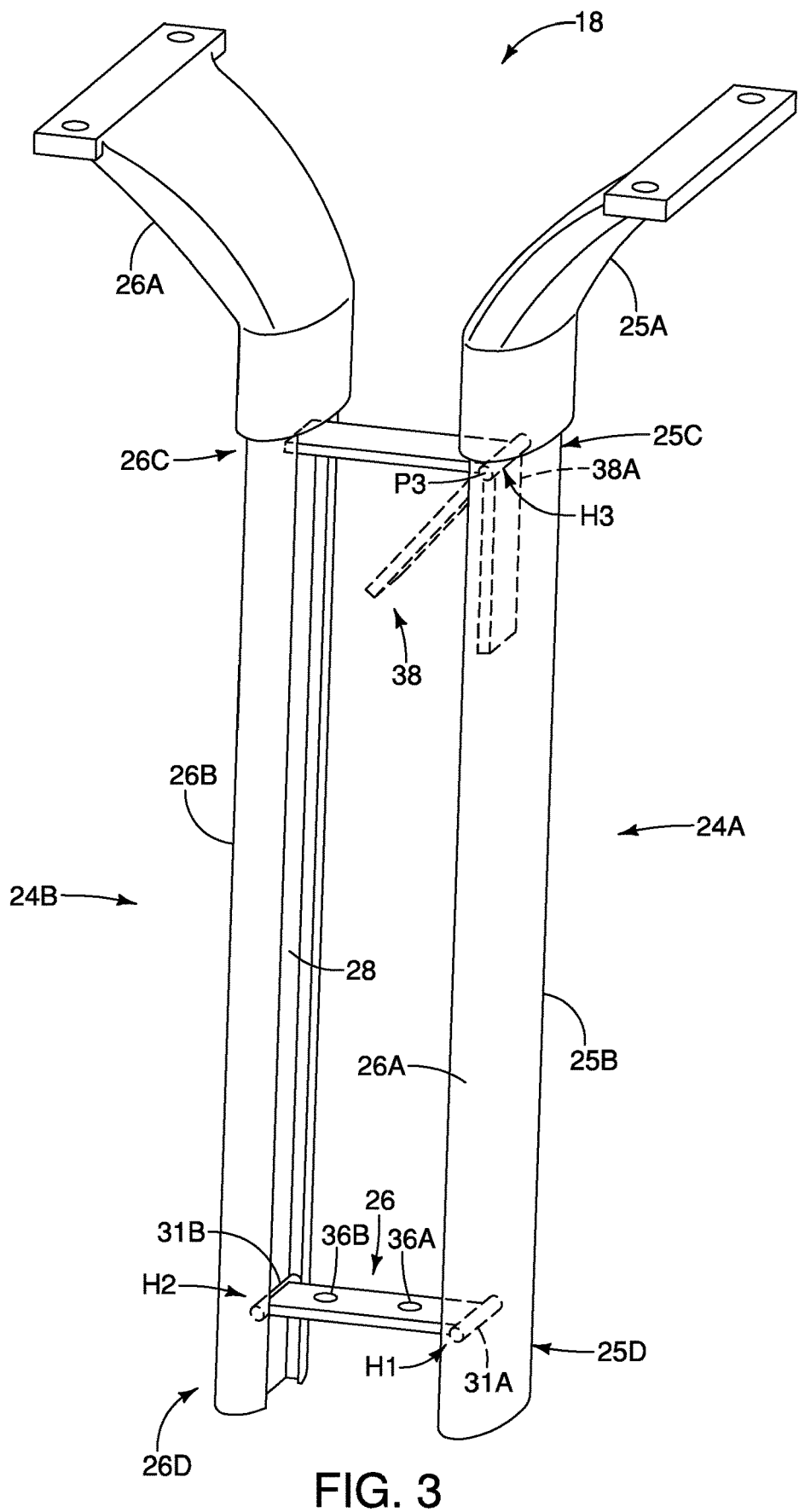
FIG. 3 is a perspective view of the crossbar assembly of FIG. 1 in the storage state.

The siderails 14A and 14B are each considered a vehicle roof rack component 20 of the vehicle roof rack assembly 12. As best seen in FIGS. 1 and 3, the siderails 14A and 14B are each a rigid bar having retention channel(s) 22 extending along a longitudinal length of the siderails 14A and 14B. The crossbar 18 is retained in the retention channels 22 of the siderails 14A and 14B. In other words, the crossbar 18 is positioned to be installed on the retention channels 22 when the crossbar 18 is in the installable state. The siderails 14A and 14B are conventional, hollow rails and will not be further discussed. The crossbar 18 can be installed onto siderails 14A and 14B using fasteners (e.g., bolts, screws, and the like) to secure the crossbar 18 to the siderails 14A and 14B.

Figure 2:
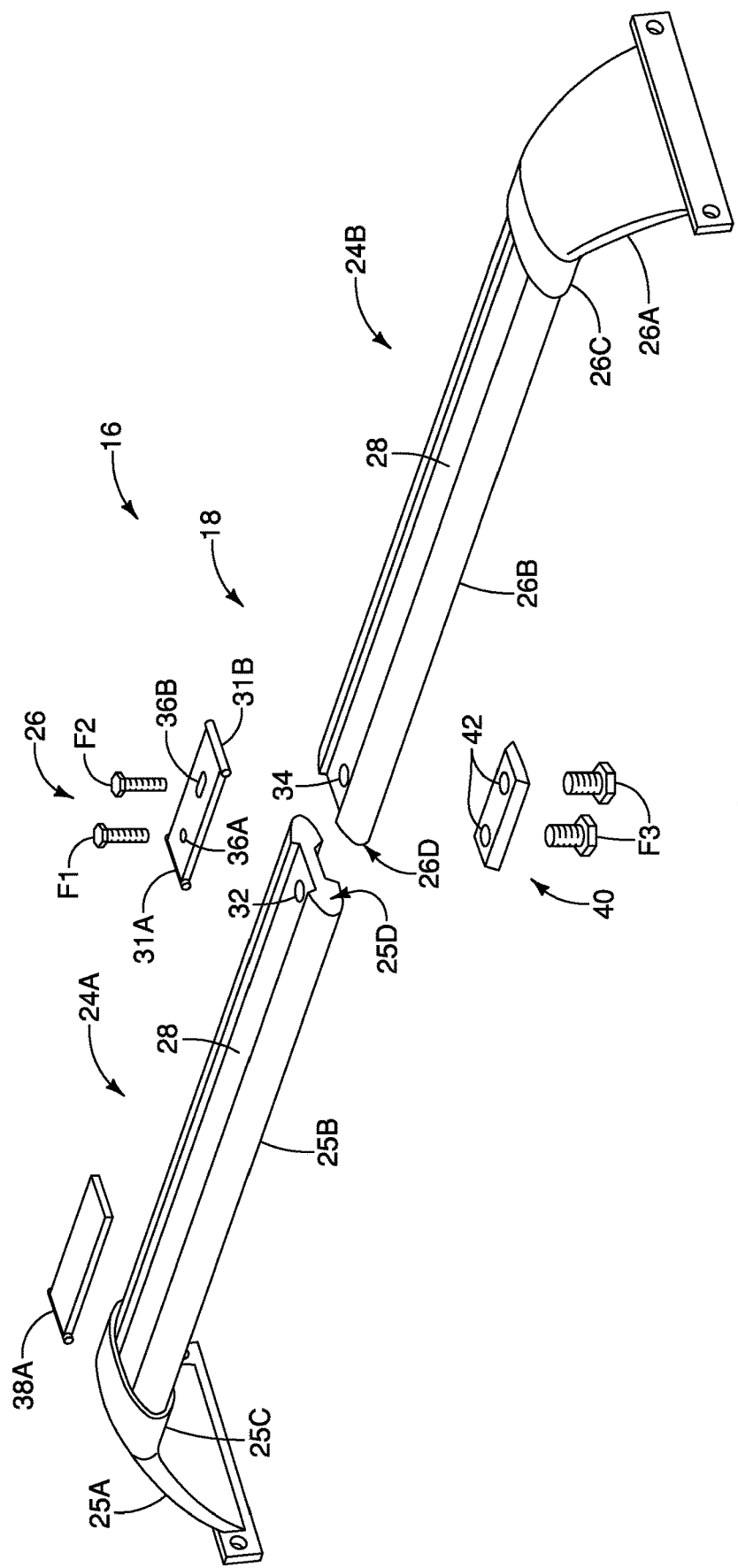
FIG. 2 is an exploded view of the crossbar assembly of FIG. 1.

Referring to FIG. 2, the crossbar 18 has a first part 24A and a second part 24B that are movably attached to each other for convenient storage of the crossbar 18 when the crossbar 18 is removed from the vehicle roof 10. The first and second parts 24A and 24B are movable with respect to each other between an installable state and a storage state of the crossbar 18. In particular, the first and second parts 24A and 24B extend from one another when the crossbar 18 is in the installable state, as seen in FIG. 1. The first and second parts 24A and 24B are folded with respect to each other when the crossbar 18 is in the storage state, as seen in FIG. 3. Alternatively speaking, the first and second parts 24A and 24B of the crossbar 18 together define a maximum longitudinal length of the crossbar 18 when the crossbar 18 is in the installable state (FIG. 1). The first and second parts 24A and 24B of the crossbar 18 extend in parallel with respect to each other when the crossbar 18 is in the storage state (FIG. 3). As will be further described below, the first and second parts 24A and 24B are detachably fixed to each other by one or more fasteners (e.g., fasteners F1, F2 and F3).

As best seen in FIGS. 2 to 5, the vehicle crossbar assembly 16 further comprises a first retention structure 26 that forms a hinge between the first and second parts 24A and 24B, as will be further discussed below. Therefore, the first and second parts 24A and 24B are pivotally attached to each other via the first retention structure 26. The first and second bars 25B and 26B can move or pivot with respect to each other so the first and second parts 24A and 24B can be folded into the storage state for convenient storage of the crossbar 18 when the crossbar 18 is removed from the siderails 14A and 14B.

As shown in FIGS. 1 and 2, the first part 24A is supported to the first siderail 14A and the second part 24B is supported to the second siderail 14B. In other words, the first part 24A is configured to be supported to a first roof rack component 20 of the vehicle roof 10 (e.g., the first siderail 14A). The second part 24B is configured to be supported to a second roof rack component 20 of the vehicle roof 10 (e.g., the second siderail 14B). As best seen in FIG. 2, the first part 24A has a first mount 25A and a first bar 25B. The first mount 25A is configured to be mounted to the first siderail 14A, and the first bar 25B extends from the first mount 25A. The second part 24B has a second mount 26A and a second bar 26B. The second mount 26A is configured to be mounted to the second siderail 14B and the second bar 26B extends from the second mount 26A. As best seen in FIG. 1, the first and second mounts 25A and 26A each include a pair of bores that align with corresponding bores of the siderails 14A and 14B for receiving fasteners therethrough so that the first and second mounts 25A and 26A are mounted to the siderails 14A and 14B.

In the illustrated embodiment, the first bar 25B can be telescopically received by the first mount 25A, and the second bar 26B can be telescopically received by the second mount 26A. The first bar 25B can alternatively be formed integrally with the first mount 25A together as a one-piece member, and the second bar 26B can alternatively be formed integrally with the second mount 26A together as a one-piece member. The first bar 25B has a first end 25C that is fixed to the first mount 25A and a second end 25D that is a free end that is to be connected to the second bar 26B. Similarly, the second bar 26B has a first end 26C that is fixed to the second mount 26A and a second end 26D that is a free end that is to be attached to the first bar 25B. The first retention structure 26 is attached to the second ends 25D and 26D of the first and second bars 25B and 26B, as will be further described below. Therefore, the first and second parts 24A and 24B are movably attached to each other by the first retention structure 26 at the first and second ends 25D and 26D of the first retention structure 26.

Figure 4:
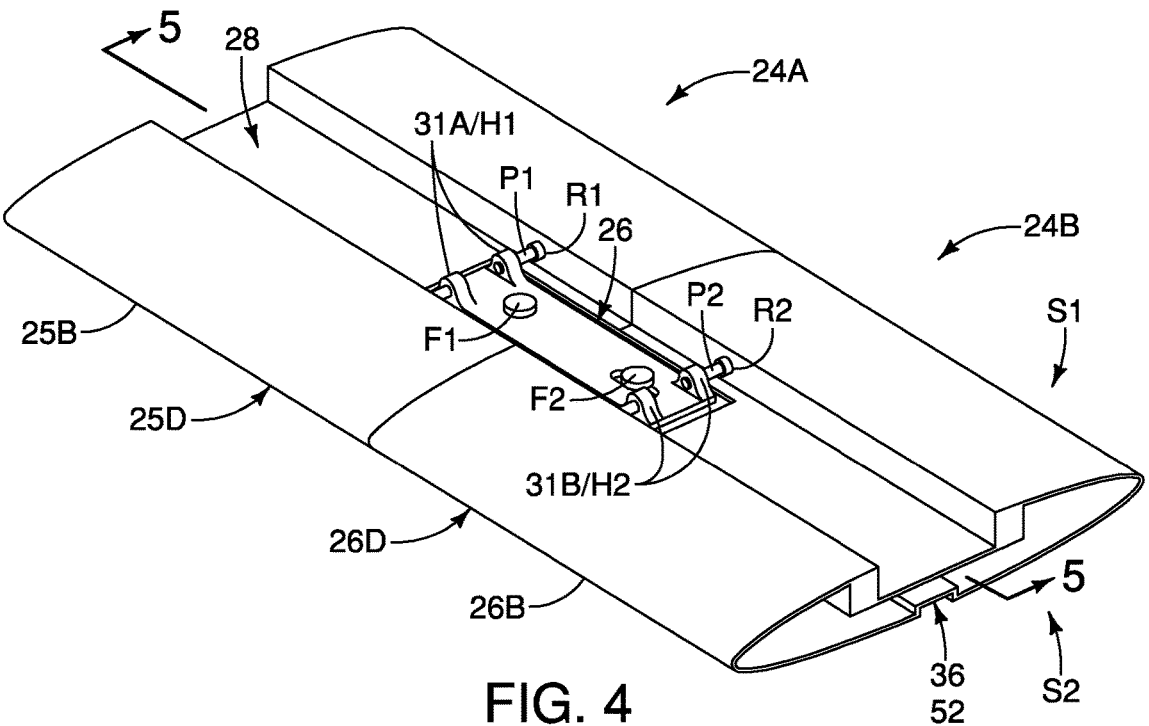
FIG. 4 is an enlarged perspective view of the crossbar assembly of FIGS. 1 to 3 showing a first retention structure attached thereon.
Figure 5:
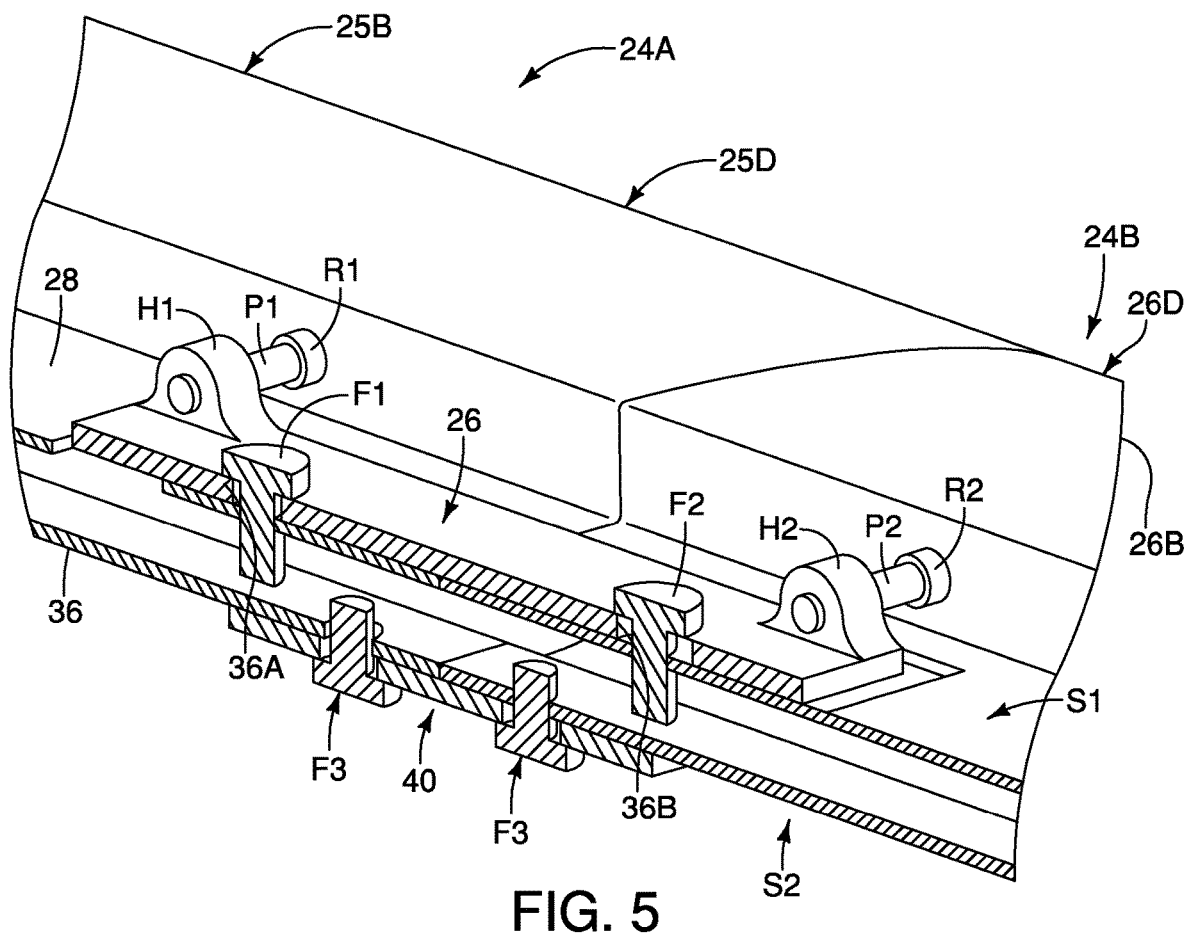
FIG. 5 is a cross-sectional view of taken along lines 5-5 of FIG. 4.
Figure 6:
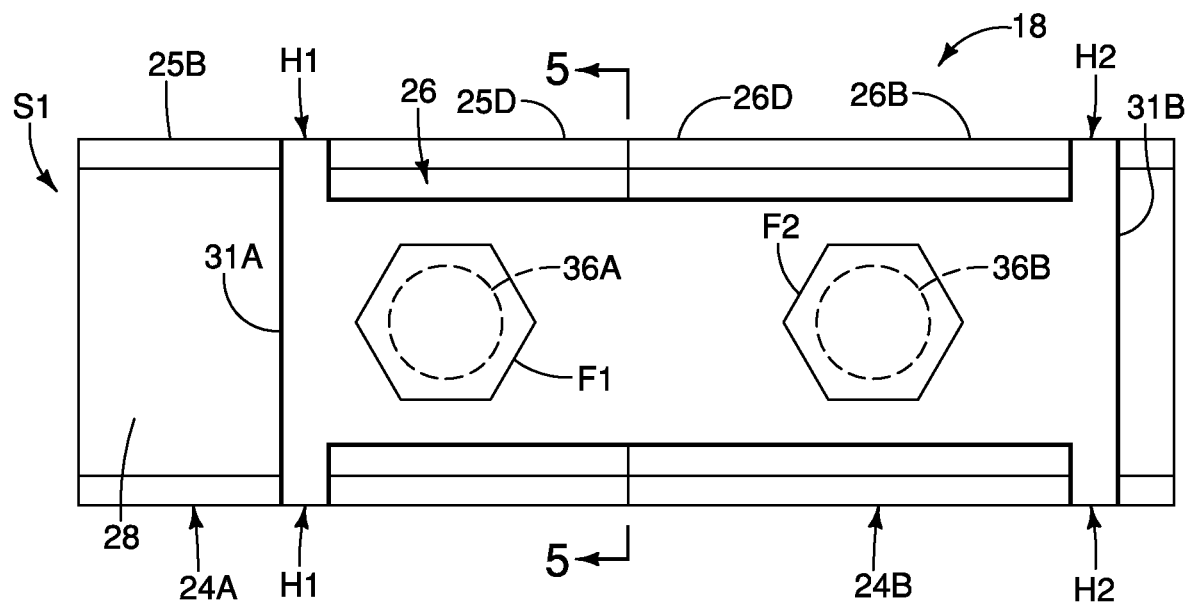
FIG. 6 is an enlarged plan view of the first retention structure of the crossbar assembly.
Figure 7:
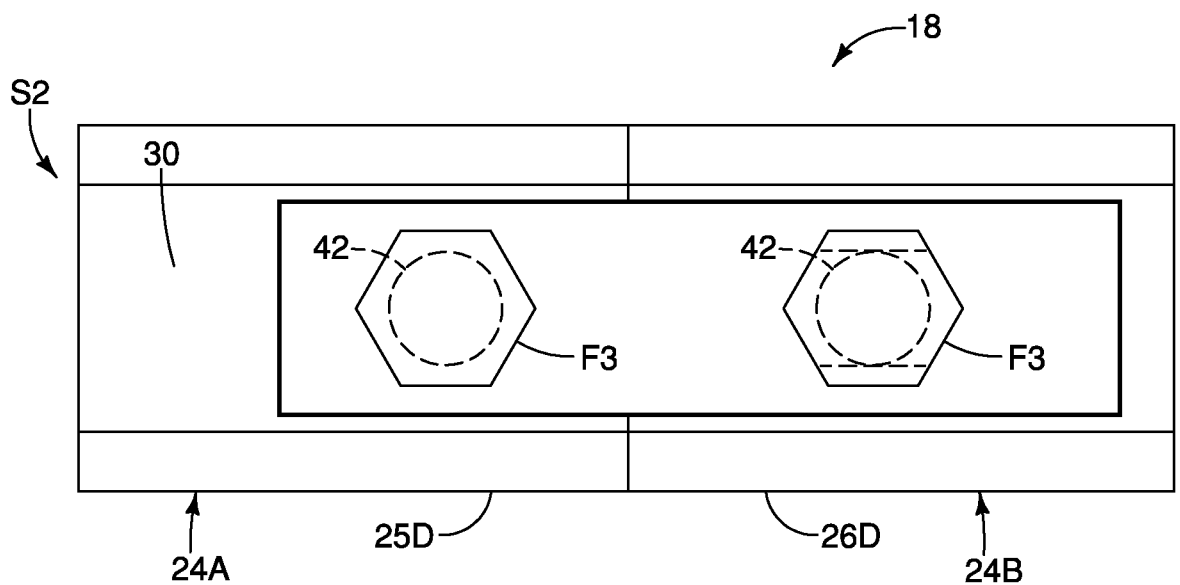
FIG. 7 is an enlarged plan view of a reinforcement structure attached to the crossbar assembly.

Referring to FIGS. 2 to 5, the first bar 25B has a top channel 28 that faces away from the vehicle roof 10 panel. Referring to FIGS. 6 and 7, crossbar 18 has a bottom channel 30 that faces the roof panel when the crossbar 18 is installed to the siderails 14A and 14B. Similarly, the crossbar 18 has a bottom channel 30 that faces the vehicle roof 10 when the crossbar 18 is installed to the siderails 14A and 14B. In other words, the top channel 28 extends from the first bar 25B to the second bar 26B so that the top channel 28 extends across the first and second parts 24A and 24B of the crossbar 18. Similarly, the bottom channel 30 extends across the first and second parts 24A and 24B of the crossbar 18.

Figure 8:
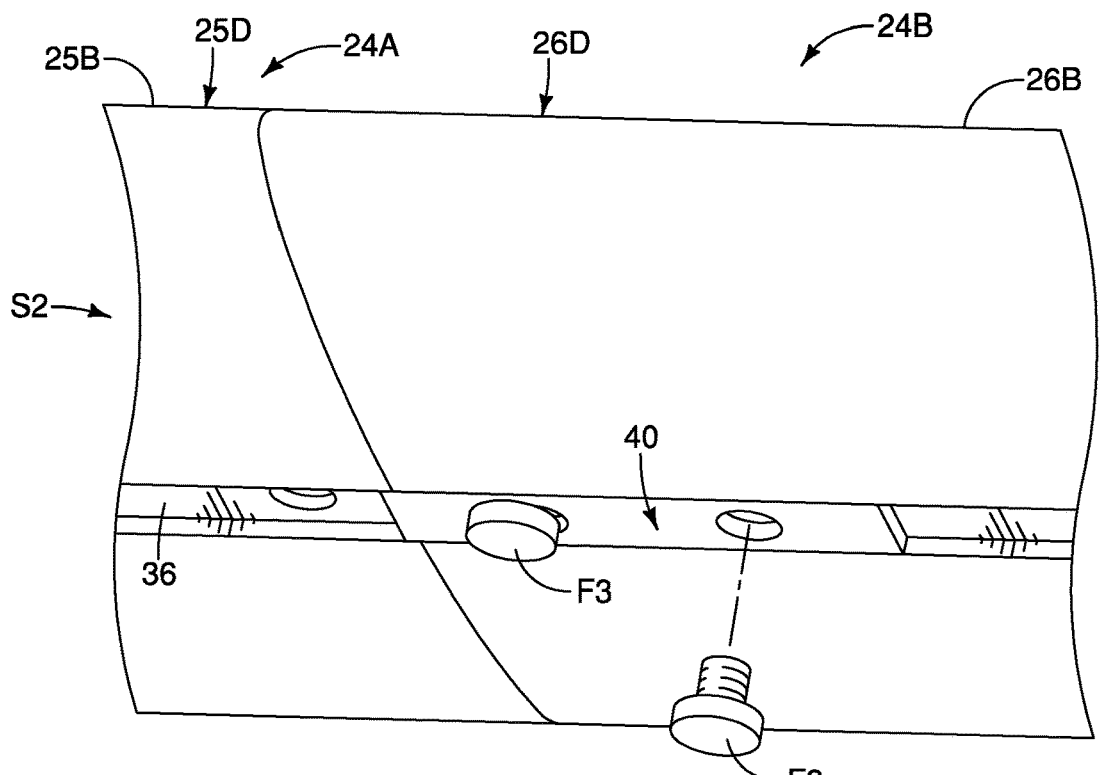
FIG. 8 is an enlarged perspective view of the reinforcement structure attached to the crossbar assembly.

The first and second parts 24A and 24B are configured to fold with respect to each other so that the top channels 28 of the first and second bars 25B and 26B are facing, as shown in FIG. 8. However, it will be apparent to those skilled in the vehicle field from this disclosure that the first and second parts 24A and 24B can be rearranged to fold in the opposite direction with respect to each other so that the bottom channels 30 are facing in the storage state.

As best seen in FIGS. 2 to 4, the first bar 25B has a through hole 32 at the second end 25D of the first bar 25B, and the second bar 26B has another through hole 34 at the second end 26D of the second bar 26B. Each of the through holes 32 and 34 are configured to receive a fastener F1 or F2 for fastening the first retention structure 26. Therefore, the crossbar 18 includes one or more fasteners (e.g., fasteners F1 and F2) for fastening the first retention structure 26 to the first and second bars 25B and 26B. As best seen in FIGS. 3 and 4, the first bar 25B includes a pair of recesses R1 at the second end 25D, and the second bar 26B also includes a pair of recesses R2 at the second end 26D. Each of the recesses receive a pin P1 and P2 at respective ends 31A and 31B of the first retention structure 26 to form a pair of hinges H1 and H2 with the first retention structure 26. In other words, in the illustrated embodiment, the crossbar 18 includes a hinge that is defined by the first retention structure 26. The first retention structure 26 includes the hinges H1 and H2 on the sides 31A and 31B, respectively, of the first retention structure 26.

In this way, the first and second bars 25B and 26B are hingedly attached to each other by the first retention structure 26. In particular, the first retention structure 26 is hingedly attached to the first bar 25B at the first end 31A of the first retention structure 26 and is hingedly attached to the second bar 26B at the second end 31B of the first retention structure 26. The first and second ends 31A and 31B of the first retention structure 26 form the hinges H1 and H2 with the first and second bars 25A and 25B, respectively.

That is, the first retention structure 26 is a rigid bar forming the pair of hinges H1 and H2 with the first and second bars 25B and 26B when the first retention structure 26 is attached to the first and second bars 25B and 26B of the crossbar 18. The first retention structure 26 is preferably made of metal such as steel. Referring to FIGS. 2, 4 and 5, the first retention structure 26 includes a pair of openings 36A and 36B that are aligned with the through holes 32 and 34 of the first and second bars 25B and 26B when the first retention structure 26 is fitted to the first and second bars 25B and 26B.

As best seen in FIGS. 2 to 5, the first retention structure 26 is fixed to the first part 24A by a first fastener F1 and is fixed to the second part 24B by a second fastener F2 when the crossbar 18 is in the installable state. The first retention structure 26 includes a pair of openings 36A and 36B that align with the through holes 32 and 34 of the first and second bars 25B and 26B, respectively. The first and second fasteners F1 and F2 are received by the openings 36A and 36B of the first retention structure 26 and the through holes 32 and 34 of the first and second bars 25B and 26B.

The first and second bars 25B and 26B are detachably fixed to each other by the first retention structure 26 when the crossbar 18 is in the installable state as shown in FIGS. 1 and 4 to 7. The first and second fasteners F1 and F2 are removed from the crossbar 18 so that the first and second parts 24A and 24B can move with respect to each other when the crossbar 18 moves from the installable state to the storage state, as seen in FIG. 3. Therefore, the first retention structure 26 is detachably fixed to the first and second bars 25B and 26B by one or more fasteners (e.g., fasteners F1 and F2). As shown, the first retention structure 26 extends across the first and second bars 25B and 26B to join the first and second bars 25B and 26B when the crossbar 18 is in the installable state as seen in FIG. 3. When the crossbar moves into the storage state, the first retention structure 26 extends away from the top channels 28 such that the first retention structure 26 is cantilevered with respect to the first and second bars 25B and 26B, as seen in FIG. 3.

The first and second bars 25B and 26B are non-movably attached to each other by the first retention structure 26 when the crossbar 18 is in the installable state, as seen in FIGS. 4 and 5. The first and second bars 25B and 26B are hingedly attached by the first retention structure 26 when the fasteners F1 and F2 are removed so that the crossbar 18 moves into the storage state. In particular, the first and second bars 25B and 26B pivot about the hinges H1 and H2 of the first retention structure 26 from the installable state into the storage state. While the first and second fasteners F1 and F2 are illustrated as threaded bolts, it will be apparent to those skilled in the vehicle field from this disclosure that the fasteners F1 and F2 can alternatively be bolts, pin, screws or rivets as needed and/or necessary.

Figure 9:
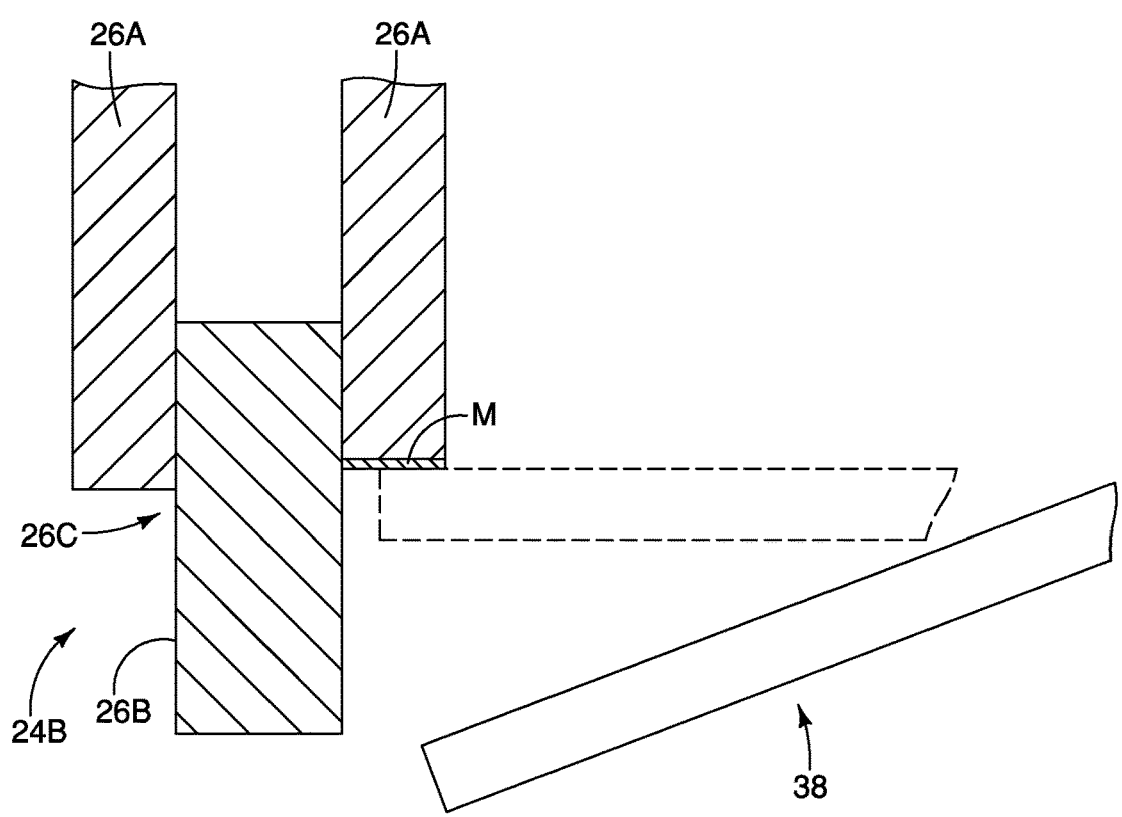
FIG. 9 is an enlarged cross-sectional view of a second retention structure of the crossbar assembly of FIGS. 1 to 3.

Referring to FIGS. 2, 3 and 9, the vehicle crossbar assembly 16 further comprises a second retention structure 38. The second retention structure 38 is illustrated as being retained in the top channel 28 of the first bar 25B. In particular, the second retention structure 38 is positioned closer to the first end 25C of the first bar 25B than to the second end 25D. In other words, the second retention structure 38 is positioned adjacent to the first mount 25A. As seen in FIG. 3, the first bar 25B has a pair of recesses (not shown) for receiving a pin P3 at an end 38A of the second retention structure 38 to form a hinge H3 with the second retention structure 38 at the end 38A.

As stated, the second retention structure 38 preferably sits in the top channel 28 of the first bar 25B. The first and second retention structures 26 and 38 are disposed on the top side of the crossbar 18 so to retain the first and second parts 24A and 24B with respect to each other when the crossbar 18 is in the storage state. When the crossbar 18 is in the storage state, the second retention structure 38 extends from the first bar 25B to the second bar 26B so that the second retention structure 38 is cantilevered with respect to the first and second bars 25B and 26B, as shown in FIG. 3.

The second retention structure 38 is retained to one of the first and second parts 24A and 24B when the crossbar 18 is in the installable state. The second retention structure 38 forms the hinge H3 with at least one of the first and second parts 24A and 24B. In other words, the second retention structure 38 contacts only one of the first and second parts 24A and 24B when the crossbar 18 is in the installable state. The second retention structure 38 contacts both the first and second parts 24A and 24B when the crossbar 18 is in the storage state.

Therefore, the second retention structure 38 is hingedly attached to only one of the first and second parts 24A and 24B. In the illustrated embodiment, the end 38A of the second retention structure 38 forms the hinge H3 with the first part 24A in a conventional manner. The second retention structure 38 is illustrated as being retained in the top channel 28 of the first part 24A in the installable state. When the crossbar 18 is in the storage state, the second retention structure 38 extends from the first part 24A to the second part 24B to help maintain the storage state of the crossbar 18, as seen in FIGS. 3 and 9. In particular, the second retention structure 38 forms the hinge H3 with the first part 24A and extends away from the first part 24A to contact the second part 24B the storage state as seen in FIG. 3.

In this way, the second retention structure 38 hingedly connects the first and second parts 24A and 24B when the crossbar 18 is in the storage state. It will be apparent to those skilled in the vehicle field from this disclosure that the second retention structure 38 can alternatively be retained in the top channel 28 of the second part 24B of the crossbar 18. Therefore, the second retention structure 38 can alternatively form a hinge with the second bar 26B and extend from the second part 24B to the first part 24A when the crossbar 18 is in the storage state.

In the illustrated embodiment, the second retention structure 38 is a magnet that is magnetically attached to at least one of the first and second parts 24A and 24B. In particular, the second retention structure 38 is magnetically attached to the second part 24B when the crossbar 18 is in the storage state. As seen in FIG. 9, the second part 24B of the crossbar 18 can include a corresponding magnet M that is fixed on the second mount 26A that is magnetically retained to the second retention structure 38 upon contact with the second retention structure 38. Alternatively, the second mount 26A can be made of metal such that the second mount 26A is magnetically connected to the second retention structure 38 upon contact.

The first and second bars 25B and 26B are also preferably made of metal that can be magnetically attached to the second retention structure 38. In particular, the second retention structure 38 is magnetically retained in the top channel 28 of the first bar 25B when the crossbar 18 is in the installable state. It will be apparent to those skilled in the vehicle field from this disclosure that the second retention structure 38 can alternatively be stored in the second part 24B and be magnetically attached to the first part 24A in the storage state as needed and/or necessary.

Referring to FIGS. 2, 5, 7 and 8, the vehicle crossbar assembly 16 further comprises a reinforcement structure 40 to help reinforce the crossbar 18 when the crossbar 18 is in the installable state. The reinforcement structure 40 is a rigid bar that is preferably made of metal, such as steel. The reinforcement structure 40 is positioned at the second ends 25D and 26D of the first and second parts 24A and 24B, respectively. The reinforcement structure 40 is positioned at the opposite side of crossbar 18 with respect to the first retention structure 26. That is, as seen in FIG. 5, the reinforcement structure 40 is positioned in the bottom channels 30 of the first and second bars 25B and 26B preferably at a location directly below first retention structure 26. The reinforcement structure 40 extends between the first and second parts 24A and 24B.

In the installable state the first retention structure 26 is positioned on a first side S1 of the crossbar 18. The reinforcement structure 40 is positioned on a second side S2 of the crossbar 18 that is opposite of the first side S1 when the crossbar 18 is in the installable state. In other words, the reinforcement structure 40 is positioned at an opposite facing side of the crossbar 18 with respect to the first retention structure 26 so that the reinforcement structure 40 and the first retention structure 26 together retain the first and second parts 24A and 24B in the installable state. The first and second retention structures 26 and 38 are retained on the same side of the crossbar 18 (e.g., the first side S1) and the reinforcement structure 40 is retained on the opposite side (e.g. the second side S2).

The reinforcement structure 40 includes a pair of openings 42 that aligns with the through holes 32 and 34 of the first and second bars 25B and 26B respectively. The reinforcement structure 40 is fastened to the first and second bars 25B and 26B by a pair of fasteners F3. As seen in FIG. 8, the fasteners F3 are removed so that the reinforcement structure 40 is removed from connected the first and second parts. The reinforcement structure 40 can thereafter be moved to be attached to just one of the first and second parts 24A and 24B (moved to the second part 24B as illustrated in FIG. 9) when the crossbar 18 is to be moved from the installable state to the storage state.

Figure 10:
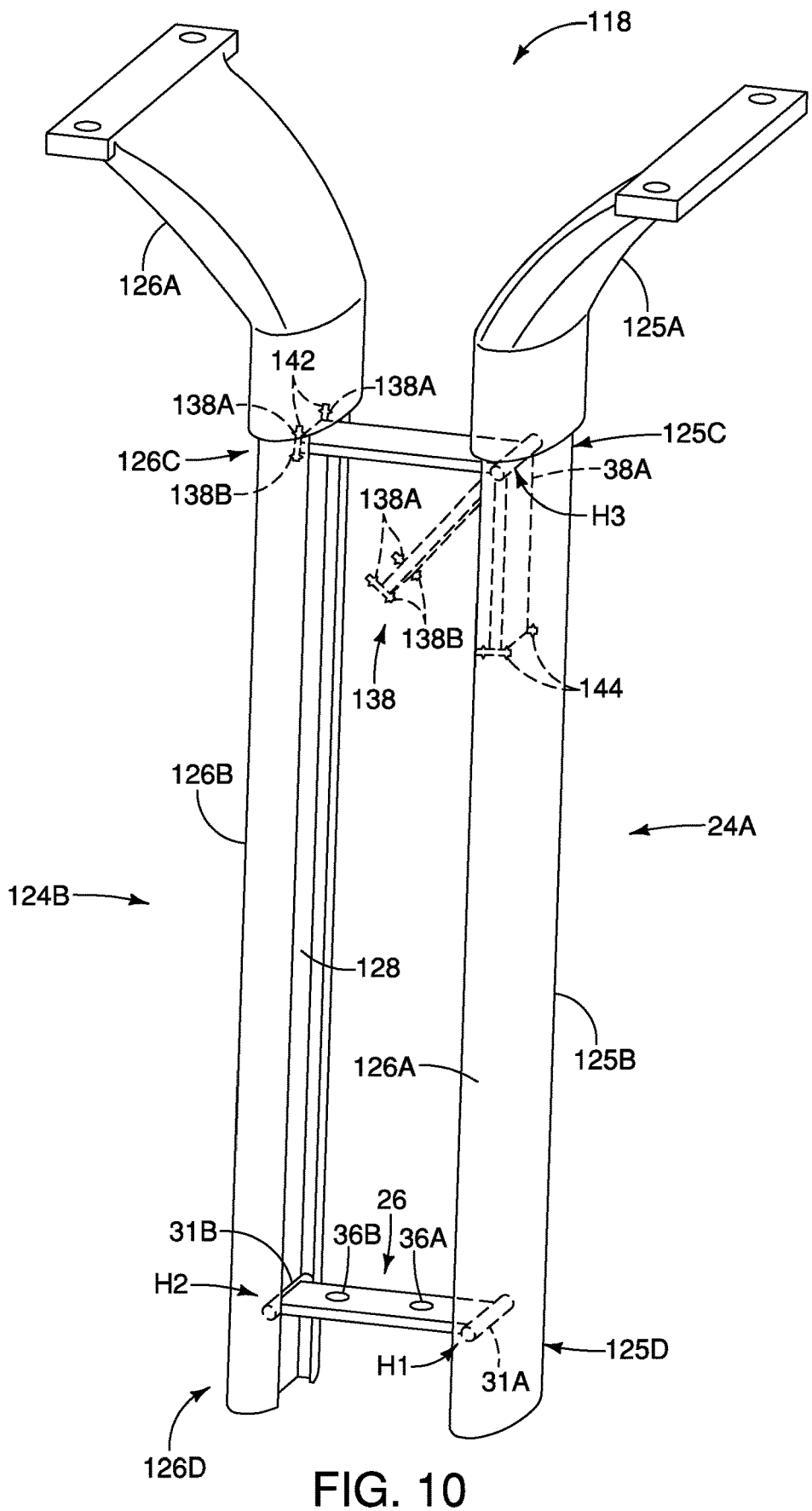
FIG. 10 is a perspective view of a modified crossbar assembly in the storage state.
Figure 11:
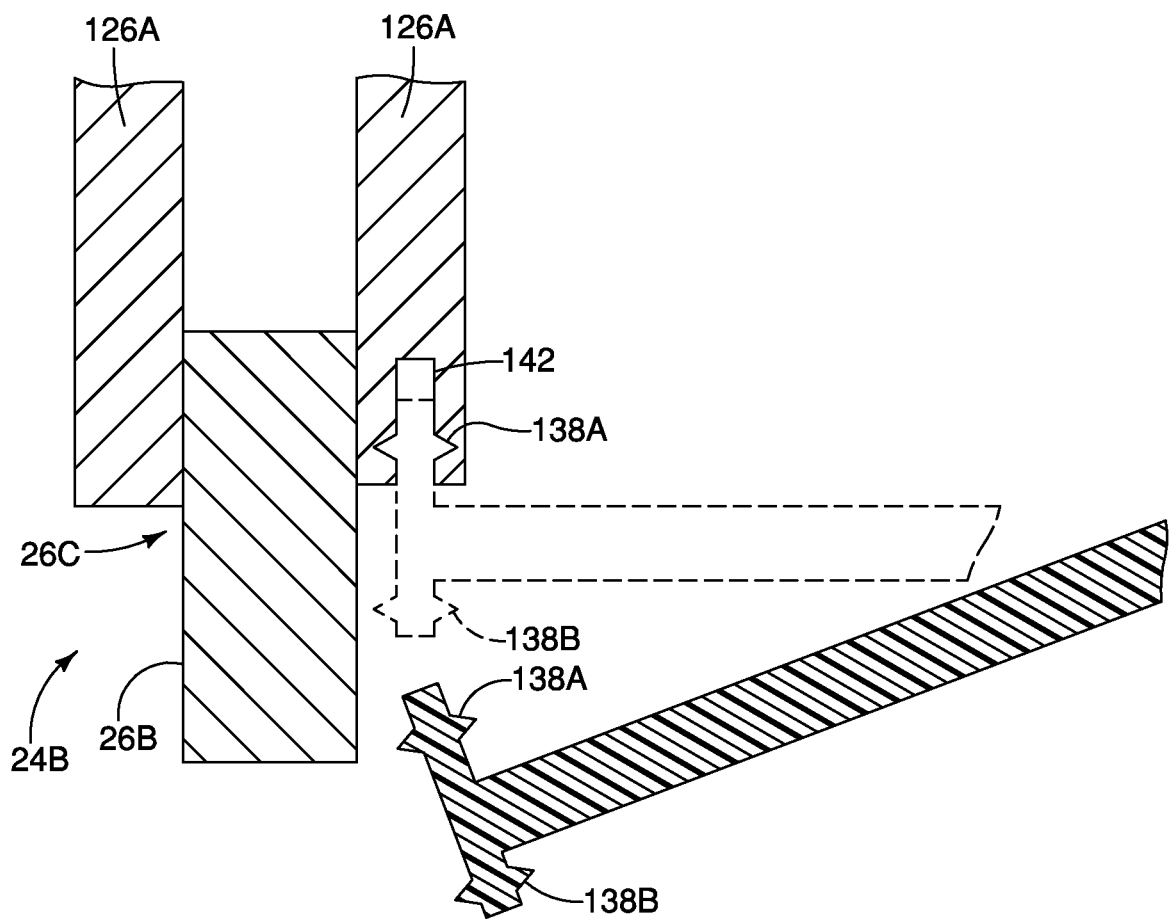
FIG. 11 an enlarged cross-sectional view of a modified second retention structure of the modified crossbar assembly of FIG. 10.

Referring now to FIGS. 10 and 11, a modified crossbar 118 that can be implemented with the vehicle roof rack assembly 12 assembly of FIG. 1 is illustrated. The modified crossbar 118 is basically identical the crossbar 18 of the first illustrated embodiment except that the modified crossbar 118 includes a modified second retention structure 138. For brevity, all corresponding components of the modified crossbar 118 and the crossbar 18 will receive the same reference numerals. All modified components of the modified crossbar 118 will receive the same reference numerals as the corresponding components of the crossbar 18 plus 100.

The modified crossbar 118 has a modified first part 124A and a modified second part 124B that are movably attached to each other for convenient storage of the crossbar 18. The first and second parts 124A and 124B are movable with respect to each other between an installable state and a storage state of the crossbar 118. The first part 124A has a first mount 25A and a first bar 125B. The second part 124B has a second mount 126A and a second bar 26B. The modified further comprises a first retention structure 26 that forms a hinge (i.e., between the first and second parts 24A and 24B). Therefore, the first and second parts 124A and 124B are pivotally attached to each other via the first retention structure 26. The first and second bars 125B and 26B are hingedly attached to each other so the first and second parts 124A and 124B can be folded into the storage state.

The modified second retention structure 138 forms a hinge with one of the first and second parts 124A and 124B (e.g., the first part 124A as shown in the illustrated embodiment). The modified second retention structure 138 is attached to the other of the first and second parts 124A and 124B by a snap-fit connection when the crossbar 118 is in the storage state (e.g., the second part 124B as shown in the illustrated embodiment). As best seen in FIG. 8, the modified second retention structure 138 includes a first pair of protrusions 138A and a pair of second pair of protrusions 138B extending oppositely from a main body of the second retention structure 138.

As shown, the second part 124B has been modified such that the second mount 126A has one or more receptacles 142 for receiving the first pair of protrusions 138A of the modified second retention structure 138 in a snap-fit connection. In particular, the second mount 126A is shown as having a pair of receptacles 142 for receiving the second retention structure 138. The first bar 25B also includes a pair of receptacles 144 for snap-fittedly receiving the second pair of protrusions 138B when the crossbar 118 is in the installable state.

The second retention structure 138 can be made of plastic. The second retention structure 138 is snap-fittedly attached to the first part 24A when the crossbar 18 is in the installable state and is snap-fittedly attached to the second part 24B when the crossbar 18 is in the storage state. It will also be apparent to those skilled in the vehicle field from this disclosure that the second retention structure 138 can alternatively be connected to the first and second bars 125B and 26B by other connections such as interference fit, press fit or other types of attachment fits as necessary and/or appropriate.

General Interpretation of Terms

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle crossbar assembly. Accordingly, these terms, as utilized to describe the present invention should be interpreted relative to a vehicle equipped with the vehicle crossbar assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle crossbar assembly comprising:
a crossbar having a first part and a second part that are movably attached to each other, the first part being configured to be supported to a first roof rack component of a vehicle, the second part being configured to be supported to a second roof rack component of the vehicle,
the first and second parts being movable with respect to each other between an installable state and a storage state, the first and second parts extending from one another when in the installable state, the first and second parts being folded with respect to each other in the storage state; and
a first retention structure that forms a hinge between the first and second parts, the first retention structure is fixed to the first part by a first fastener and is fixed to the second part by a second fastener when the crossbar is in the installable state,
the first and second fasteners being removed from the crossbar so that the first and second parts can move with respect to each other when the crossbar moves from the installable state to the storage state.

2. The vehicle crossbar assembly according to claim 1, wherein
the first part has a first mount and a first bar, the first mount being configured to be mounted to the first roof rack component, the first bar extending from the first mount,
the second part has a second mount and a second bar, the second mount being configured to be mounted to the second roof rack component, the second bar extending from the second mount,
the first and second bars being hingedly attached by the first retention structure.

3. The vehicle crossbar assembly according to claim 1, wherein
the first retention structure is hingedly attached to the first bar and is hingedly attached to the second bar.

4. The vehicle crossbar assembly according to claim 1, wherein
a second retention structure that is retained to one of the first and second parts when the crossbar is in the installable state, the second retention structure contacting both the first and second parts when the crossbar is in the storage state.

5. The vehicle crossbar assembly according to claim 4, wherein
the second retention structure is a magnet that is magnetically attached to at least one of the first and second parts.

6. The vehicle crossbar assembly according to claim 5, wherein
the second retention structure forms a hinge with one of the first and second parts, the second retention structure being magnetically attached to the other of the first and second parts when the crossbar is in the storage state.

7. The vehicle crossbar assembly according to claim 4, wherein
the second retention structure forms a hinge with one of the first and second parts, the second retention structure being attached to the other of the first and second parts by a snap-fit connection when the crossbar is in the storage state.

8. The vehicle crossbar assembly according to claim 1, further comprising
a reinforcement structure,
in the installable state, the first retention structure being positioned on a first side of the crossbar, the reinforcement structure being positioned on a second side of the crossbar that is opposite of the first side.

9. A vehicle crossbar assembly comprising:
a crossbar having a first part and a second part that are movable with respect to each other between an installable state in which the first and second parts extend from one another, and a storage state in which the first and second parts are folded with respect to each other;
a reinforcement structure, in the installable state, the reinforcement structure extending across the first and second parts in the installable state, the reinforcement structure being removed from the first and second parts in the storage state; and
a first retention structure hingedly connecting the first and second parts when the crossbar is in the storage state, the first retention structure being positioned on a first side of the crossbar, the reinforcement structure being positioned on a second side of the crossbar that is opposite of the first side.

10. The vehicle roof rack assembly according to claim 9, wherein
the first retention structure fixedly attaches the first and second parts when the crossbar is in the installable state.

11. The vehicle crossbar assembly according to claim 9, further comprising
a second retention structure hingedly connecting the first and second parts when the crossbar is in the storage state.

12. A vehicle roof rack assembly, comprising:
a first siderail and a second siderail that are installed to a vehicle roof;
a crossbar having a first part supported to the first siderail and a second part supported to the second siderail, the crossbar being movable between an installable state in which the crossbar is installed to the first and second siderails and a storage state in which the first and second parts are folded with respect to each other;
a first retention structure that forms a hinge between the first and second parts; and
a reinforcement structure, in the installable state, the first retention structure being positioned on a first side of the crossbar, the reinforcement structure being positioned on a second side of the crossbar that is opposite of the first side, the reinforcement structure extending across the first and second parts in the installable state, the reinforcement structure being removed from the first and second parts in the storage state.

13. The vehicle roof rack assembly according to claim 12, wherein
the first part has a first mount and a first bar, the first mount being supported to the first siderail, the first bar extending from the second mount, the second part has a second mount and a second bar, the second mount being supported to the second siderail, the second bar extending from the second mount, the first and second bars being hingedly attached to each other so the first and second parts can be folded into the storage state.

14. The vehicle roof rack assembly according to claim 13, wherein the first retention structure fixedly attaches the first and second parts when the crossbar is in the installable state.

\* \* \* \* \*